(12) United States Patent
Books et al.

(10) Patent No.: US 7,835,847 B2
(45) Date of Patent: Nov. 16, 2010

(54) APPARATUS, SYSTEM, AND METHOD FOR DETERMINING A REGENERATION AVAILABILITY PROFILE

(75) Inventors: Martin T. Books, Columbus, IN (US); Melissa H. Dye, Columbus, IN (US); J. Steve Wills, Columbus, IN (US)

(73) Assignee: Cummins IP, Inc, Minneapolis, MN (US)

( * ) Notice: Subject to any disclaimer, the term of this patent is extended or adjusted under 35 U.S.C. 154(b) by 330 days.

(21) Appl. No.: 12/039,614

(22) Filed: Feb. 28, 2008

(65) Prior Publication Data

US 2009/0222189 A1 Sep. 3, 2009

(51) Int. Cl.
*G06F 19/00* (2006.01)
*F01N 3/023* (2006.01)

(52) U.S. Cl. .................. 701/102; 60/276; 60/295; 60/297; 60/311

(58) Field of Classification Search ......... 701/101–103, 701/114, 115; 60/274, 276, 278, 280, 286, 60/295, 297, 311, 301, 303
See application file for complete search history.

(56) References Cited

U.S. PATENT DOCUMENTS

| | | | |
|---|---|---|---|
| 4,651,524 A | 3/1987 | Brighton |
| 6,405,528 B1 | 6/2002 | Christen et al. |
| 6,662,480 B1 | 9/2002 | Tashrio et al. |
| 6,634,170 B2 | 10/2003 | Hiranuma et al. |
| 6,666,020 B2 | 12/2003 | Tonetti et al. |
| 6,735,941 B2 | 5/2004 | Saito et al. |
| 6,756,904 B2 | 6/2004 | Kinugawa et al. |
| 6,758,039 B2 | 7/2004 | Kuboshima et al. |
| 6,805,095 B2 | 10/2004 | Sun et al. |
| 6,820,418 B2 | 11/2004 | Nakatani et al. |
| 6,829,889 B2 | 12/2004 | Saito et al. |
| 6,829,890 B2 | 12/2004 | Gui et al. |
| 6,851,258 B2 | 2/2005 | Kawashima et al. |
| 6,854,265 B2 | 2/2005 | Saito et al. |
| 6,862,927 B2 | 3/2005 | Craig et al. |
| 6,865,885 B2 | 3/2005 | Kitahara |
| 6,907,873 B2 | 6/2005 | Hamahata |
| 6,928,809 B2 | 8/2005 | Inoue et al. |
| 6,941,750 B2 | 9/2005 | Boretto et al. |
| 6,951,100 B2 | 10/2005 | Kuboshima et al. |
| 6,966,178 B2 | 11/2005 | Saito et al. |
| 6,969,413 B2 | 11/2005 | Yahata et al. |
| 6,983,591 B2 | 1/2006 | Kondo et al. |
| 7,000,384 B2 | 2/2006 | Kagenishi |

(Continued)

FOREIGN PATENT DOCUMENTS

EP 1568865 A1 8/2005

*Primary Examiner*—Willis R Wolfe, Jr.
(74) *Attorney, Agent, or Firm*—Kunzler Needham Massey & Thorpe

(57) ABSTRACT

An apparatus, system, and method are disclosed for determining a regeneration availability profile for an exhaust gas aftertreatment system. The method, in one embodiment, tracks historical attempts and success to determine the availability of regeneration for the system. In a further embodiment, the method divides the system operation into segments according to desired conditions which affect regeneration, for example the workload of an engine, and tracks separate success ratios for each operating condition. This allows prediction of success of a given regeneration based upon the current operating condition, as well as diagnostics of regeneration problems where an operating condition experiences trouble regenerating when historically it should not.

27 Claims, 4 Drawing Sheets

U.S. PATENT DOCUMENTS

| | | |
|---|---|---|
| 7,054,734 B2 | 5/2006 | Todoroki et al. |
| 7,069,721 B2 | 7/2006 | Gotou |
| 7,107,760 B2 | 9/2006 | Shirakawa |
| 7,111,455 B2 | 9/2006 | Okugawa et al. |
| 7,137,247 B2 | 11/2006 | Koga et al. |
| 7,147,693 B2 | 12/2006 | Inoue et al. |
| 7,162,867 B2 | 1/2007 | Saito et al. |
| 7,169,364 B2 | 1/2007 | Ohtake et al. |
| 7,208,029 B2 | 4/2007 | Shirakawa et al. |
| 7,231,291 B2 | 6/2007 | Dollmeyer et al. |
| 7,254,940 B2 | 8/2007 | Saitoh et al. |
| 7,264,642 B2 | 9/2007 | Hamahata et al. |
| 7,275,365 B2 | 10/2007 | Zhan et al. |
| 7,587,892 B2 * | 9/2009 | Dye et al. .............. 60/295 |
| 7,677,030 B2 * | 3/2010 | Dye et al. .............. 60/295 |
| 2002/0112472 A1 | 8/2002 | Tashiro et al. |
| 2002/0196153 A1 | 12/2002 | Kinugawa et al. |
| 2003/0167757 A1 | 9/2003 | Boretto et al. |
| 2003/0200742 A1 | 10/2003 | Smaling |
| 2003/0230079 A1 | 12/2003 | Kuboshima et al. |
| 2004/0103654 A1 | 6/2004 | Ohtake et al. |
| 2004/0159098 A1 | 8/2004 | Gui et al. |
| 2004/0159099 A1 | 8/2004 | Kuboshima et al. |
| 2004/0172933 A1 | 9/2004 | Saito et al. |
| 2004/0194453 A1 | 10/2004 | Koga et al. |
| 2004/0200271 A1 | 10/2004 | van Nieuwstadt |
| 2004/0204818 A1 | 10/2004 | Trudell et al. |
| 2005/0022519 A1 | 2/2005 | Shirakawa |
| 2005/0022520 A1 | 2/2005 | Shirakawa et al. |
| 2005/0044846 A1 | 3/2005 | Yahata et al. |
| 2006/0277898 A1 | 12/2006 | McCarthy, Jr. |
| 2007/0006577 A1 | 1/2007 | Yokoyama et al. |
| 2007/0130922 A1 * | 6/2007 | Dye et al. .............. 60/295 |
| 2009/0093947 A1 * | 4/2009 | Schnorbus et al. ......... 701/103 |
| 2009/0272263 A1 * | 11/2009 | Bailey et al. ............. 95/3 |

* cited by examiner

APPARATUS, SYSTEM, AND METHOD FOR DETERMINING A REGENERATION AVAILABILITY PROFILE

FIELD OF THE INVENTION

This invention relates to exhaust gas after-treatment systems and more particularly relates to apparatus, systems and methods for defining a regeneration availability profile.

DESCRIPTION OF THE RELATED ART

Environmental concerns have motivated the implementation of emission requirements for internal combustion engines throughout much of the world. Governmental agencies, such as the Environmental Protection Agency (EPA) in the United States, carefully monitor the emission quality of engines and set acceptable emission standards, to which all engines must comply. Generally, emission requirements vary according to engine type. Emission tests for compression-ignition (diesel) engines typically monitor the release of diesel particulate matter (PM), nitrogen oxides ($NO_x$), and unburned hydrocarbons (UHC). Catalytic converters implemented in an exhaust gas after-treatment system have been used to eliminate many of the pollutants present in exhaust gas. However, to remove diesel particulate matter, typically a diesel particulate filter (DPF) must be installed downstream from a catalytic converter, or in conjunction with a catalytic converter.

A common diesel particulate filter comprises a porous ceramic matrix with parallel passageways through which exhaust gas passes. Particulate matter subsequently accumulates on the surface of the filter, creating a buildup which must eventually be removed to prevent obstruction of the exhaust gas flow. Common forms of particulate matter are ash and soot. Ash, typically a residue of burnt engine oil, is substantially incombustible and builds slowly within the filter. Soot, chiefly composed of carbon, results from incomplete combustion of fuel and generally comprises a large percentage of particulate matter buildup. Various conditions, including, but not limited to, engine operating conditions, mileage, driving style, terrain, etc., affect the rate at which particulate matter accumulates within a diesel particulate filter.

Accumulation of particulate matter typically causes backpressure within the exhaust system. Excessive backpressure on the engine can degrade engine performance. Particulate matter, in general, oxidizes in the presence of $NO_2$ at modest temperatures, or in the presence of oxygen at higher temperatures. If too much particulate matter has accumulated when oxidation begins, the oxidation rate may get high enough to cause an uncontrolled temperature excursion. The resulting heat can destroy the filter and damage surrounding structures. Recovery can be an expensive process.

To prevent potentially hazardous situations, accumulated particulate matter is commonly oxidized and removed in a controlled regeneration process before excessive levels have accumulated. To oxidize the accumulated particulate matter, exhaust temperatures generally must exceed the temperatures typically reached at the filter inlet. Consequently, additional methods to initiate regeneration of a diesel particulate filter may be used. In one method, a reactant, such as diesel fuel, is introduced into an exhaust after-treatment system to initiate oxidation of particulate buildup and to increase the temperature of the filter. A filter regeneration event occurs when substantial amounts of soot are consumed on the particulate filter. Partial or complete regeneration may occur depending on the duration of time the filter is exposed to elevated temperatures and the amount of particulate matter remaining on the filter. Partial regeneration can contribute to irregular distribution of particulate matter across the substrate of a particulate filter.

Controlled regeneration traditionally has been gauged by set intervals, such as distance traveled or time passed. Interval based regeneration, however, has proven to be inadequate for several reasons. First, regenerating a particulate filter with little or no particulate buildup lessens the fuel economy of the engine and exposes the particulate filter to unnecessary high temperature cycles. Second, if particulate matter accumulates excessively before the next regeneration, backpressure from blockage of the exhaust flow can negatively affect engine performance. In addition, regeneration with excessive levels of particulates present can potentially cause filter failure or the like. Consequently, particulate filters regenerated on a set interval must be replaced frequently to maintain the integrity of an exhaust gas after-treatment system.

Aftertreatment systems must generally be produced with no knowledge of the specific final application for each system. The final application affects the regeneration opportunities available to the aftertreatment system. For example, some systems will be installed in applications that haul heavy loads for long distances, and the aftertreatment system can achieve a controlled regeneration whenever desired because it is always easy to generate temperature in the exhaust stream. Some systems will be installed in applications like a lightly loaded stop and go delivery vehicle, and the aftertreatment system can only achieve short periods of temperature generation.

The aftertreatment system cannot be produced with the final application specifically known, and even if the aftertreatment system can know the initial application after the first sale of the system, the subsequent applications of the system cannot be known because the initial user is not generally restricted from selling or changing the usage of the device on which the aftertreatment system is installed. Without a way to determine the final application while the aftertreatment system is in use, the aftertreatment system must be built for the extremes of the possible applications. This means that either all of the aftertreatment systems will be produced to handle the worst regeneration opportunity situations, and therefore the systems will have lower fuel economy than otherwise possible, or the designer will have to accept a relatively higher level of risk for those systems that have fewer regeneration opportunities than the aftertreatment systems are designed for, and thus a number of particulate filters will overload with soot and be subjected to an uncontrolled regeneration event.

If a controller could know the application usage profile, then the controller could take mitigating actions to make successful regeneration more likely in a given application. For example, if the controller knew the application was a stop and go, lightly loaded application, the controller could take advantage of every available regeneration opportunity, regardless of whether the "standard" control setup would require a regeneration each time. Likewise, in a heavy hauling application, the controller could allow the particulate filter to fill up each time, knowing that when regeneration is attempted it will succeed, and therefore maximize the fuel economy and minimize the number of thermal cycles, and thus thermal fatigue, on the components of the aftertreatment system. Ideally, the controller would track regeneration success against various operating parameters to determine the likelihood of a regeneration success, and to diagnose problems when the regeneration success rate degrades for a given operating condition.

From the foregoing discussion, it should be apparent that a need exists for an apparatus, system, and method for detecting and evaluating the regeneration opportunities available to a specific application in the field, which can be termed a regeneration availability profile. Beneficially, such an apparatus, system, and method provide the aftertreatment system with the overall profile of regeneration opportunities, as well as provide information to allow a controller to recognize abnormal events within the overall profile. Thus, the apparatus, system, and method would enable tailoring of regeneration controls to specific applications, and therefore increase the fuel economy and reduce the uncontrolled regeneration events for aftertreatment systems.

SUMMARY OF THE INVENTION

The present invention has been developed in response to the present state of the art, and in particular, in response to the problems and needs in the art that have not yet been fully solved by currently available exhaust gas after-treatment systems requiring particulate filter regeneration. Accordingly, the present invention has been developed to provide an apparatus, system, and method to determine a regeneration availability profile that overcomes many or all of the above-discussed shortcomings in the art.

In one aspect of the invention, an exhaust gas aftertreatment system includes an exhaust gas aftertreatment component which treats the exhaust gas, and the component requires periodic regenerations under specific conditions. The exhaust gas aftertreatment system includes a controller, in one embodiment, that may have an achievement data module, an operating condition module, a starting regeneration availability profile (RAP) module, an RAP adjustment module, and a storage module.

The achievement data module may be configured to determine achievement data determined from the current conditions of the exhaust gas aftertreatment component relative to the conditions required to achieve regeneration of the exhaust gas aftertreatment component. The operating condition module may be configured to determine the operating conditions—an engine speed and load, in one example—of a power application associated with the aftertreatment component. The starting RAP module may be configured to read a starting RAP from computer memory. The RAP adjustment module may be configured to adjust the starting RAP, based on the achievement data, the current conditions of the exhaust gas aftertreatment system, and the power application operating conditions, to generate an adjusted RAP. In one embodiment, the storage module records the adjusted RAP into computer memory, and the storage module may store historical RAP information beyond just the most recent RAP.

In a further aspect of the invention, a method comprises determining achievement data from the current conditions of an exhaust gas aftertreatment component relative to the conditions required to achieve regeneration of the exhaust gas aftertreatment component. The method may further comprise reading a starting RAP. In one embodiment, the method further comprises determining the operating conditions of a power application associated with the aftertreatment component. The method may proceed to generate an adjusted RAP from the achievement data, the starting RAP, and the current operating conditions of the power application associated with the aftertreatment component.

In a further aspect of the invention, the adjusted RAP comprises a regeneration success value for each of a set of data segments, where each data segment corresponds to one of the potential operating conditions for the power application. Generating the adjusted RAP may comprise adjusting each regeneration success value based upon the current operating condition and the achievement data. The method may proceed to store the adjusted RAP after the adjusted RAP is generated.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
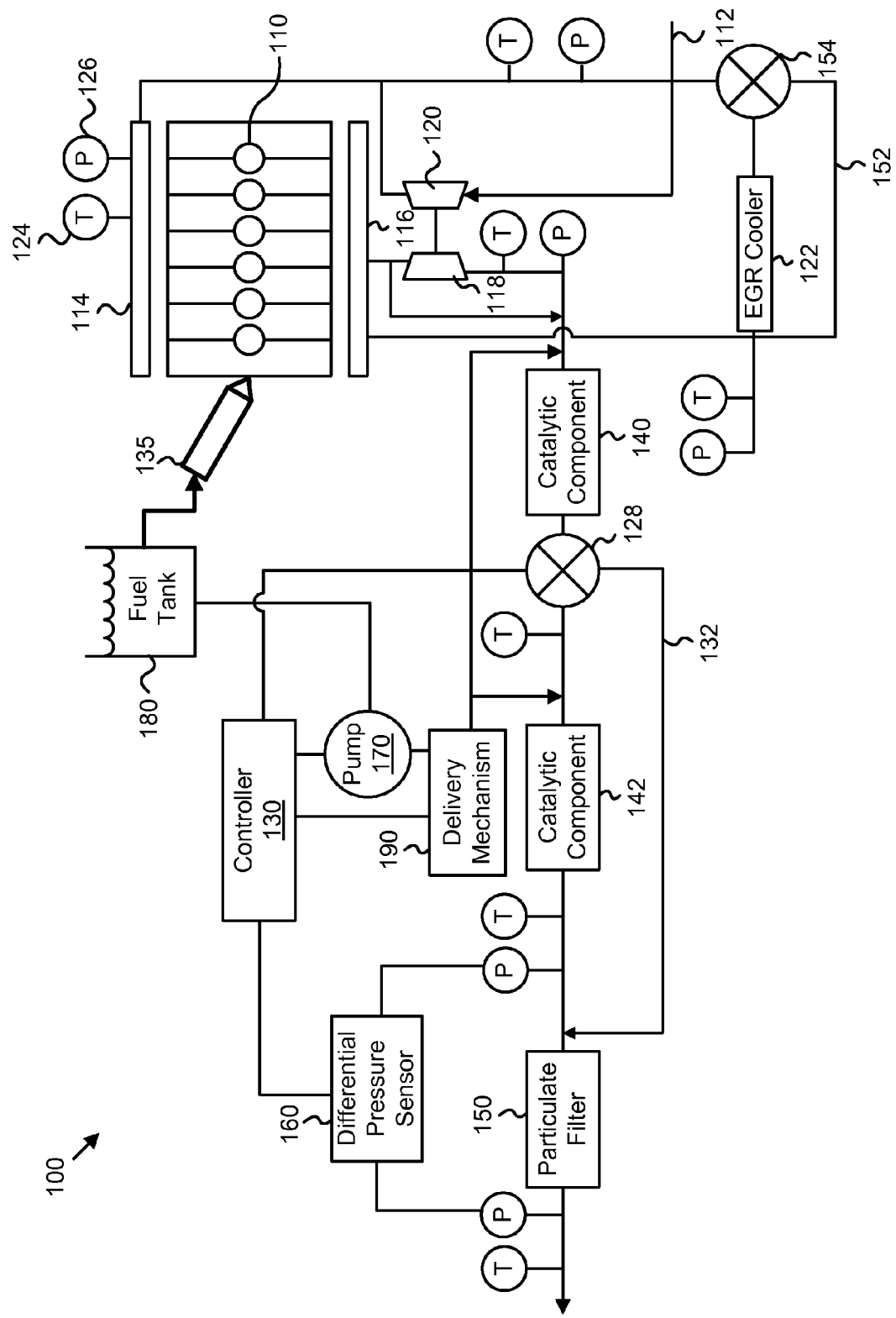
FIG. 1 is a schematic block diagram illustrating one embodiment of an exhaust gas after-treatment system in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 depicts one embodiment of an exhaust gas aftertreatment system 100, in accordance with the present invention. As illustrated, the exhaust gas aftertreatment system 100 may include a diesel engine 110, a controller 130, fuel injectors 135, a first catalytic component 140, a second catalytic component 142, particulate filter 150, and fuel tank 180.

The engine system 100 may further include an air inlet 112, intake manifold 114, exhaust manifold 116, turbocharger turbine 118, turbocharger compressor 120, exhaust gas recirculation (EGR) cooler 122, various temperature sensors 124, and various pressure sensors 126. In one embodiment, an air inlet 112 vented to the atmosphere enables air to enter the engine system 100. The air inlet 112 may be connected to an inlet of the intake manifold 114. The intake manifold 114 includes an outlet operatively coupled to the combustion chambers of the engine 110. Within the engine 110, compressed air from the atmosphere is combined with fuel from the injectors 135 to power the engine 110, which comprises operation of the engine 110. The fuel comes from the fuel tank 180 through a fuel delivery system including, in one embodiment, a fuel pump and common rail (not shown) to the fuel injectors 135, which inject fuel into the combustion chambers of the engine 110. The timing of the fuel injection is controlled by the controller 130. Combustion of the fuel produces exhaust gas that is operatively vented to the exhaust manifold 116. From the exhaust manifold 116, a portion of the exhaust gas may be used to power a turbocharger turbine 118. The turbine 118 may drive a turbocharger compressor 120, which compresses engine intake air before directing it to the intake manifold 114.

At least a portion of the exhaust gases output from the exhaust manifold 116 is directed to the particulate filter 150 for filtering of particulate matter before venting to the atmosphere. The exhaust gas may pass through one or more catalytic components 140, 142, the catalytic components, in one embodiment, configured to further reduce the number of pollutants and to assist in oxidizing added hydrocarbons to generate temperature. For example, in one embodiment, catalytic component 140 comprises a diesel oxidation catalyst configured to oxidize hydrocarbons in the exhaust gas, while component 142 comprises a $NO_x$ adsorber configured to capture NO and $NO_2$ from the exhaust gas, and convert it to $N_2$ upon later release during a regeneration event.

A differential pressure sensor 160 is used, in one embodiment, to determine the amount of particulate matter accumulated on the particulate filter. A fuel delivery mechanism 190 is used to add hydrocarbons to the exhaust stream to generate temperature. The fuel delivery mechanism may inject hydrocarbons into the exhaust stream in front of at least one catalytic component 140, 142 as shown, or the fuel injectors 135 may be configured to inject hydrocarbons into the exhaust stream by injecting into the engine 110 at a time when those hydrocarbons will not combust within the engine 110.

Some amount of the exhaust gas may be re-circulated to the engine 110, according to a proportion set by the controller 130 utilizing the EGR valve 154. In certain embodiments, the EGR cooler 122, which is operatively connected to the inlet of the intake manifold 114, cools exhaust gas in order to facilitate increased engine air inlet density. In one embodiment, an EGR bypass 152 diverts some or all of the EGR gas around the EGR cooler 122, using bypass valves (not shown) to manipulate the temperature and pressure of the gases in the intake manifold 114.

Various sensors, such as temperature sensors 124, pressure sensors 126, flow sensors on any system section (not shown) and the like, may be strategically disposed throughout the engine system 100 and may be in communication with the controller 130. In some cases a pressure sensor measures a value of a pressure, either gauge or absolute, and in some cases a pressure sensor is measuring a pressure differential between two system locations. In a given embodiment, when a sensor is present, the sensor may be a virtual sensor—a value for the parameter in question that is determined by the controller 130 based upon other measured parameters, and not an input from a direct physical measurement.

Figure 2:
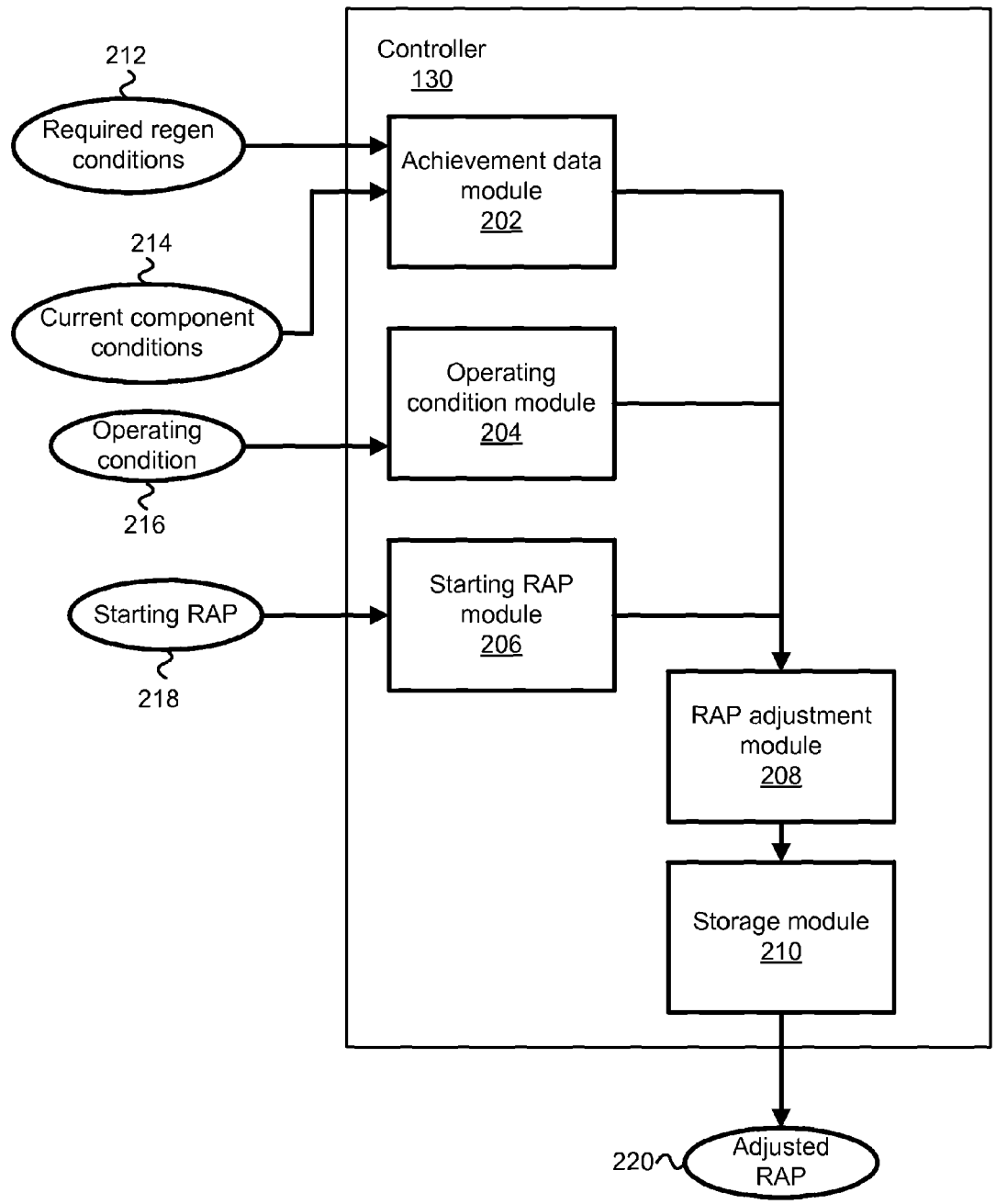
FIG. 2 is a schematic block diagram illustrating one embodiment of a controller in accordance with the present invention.

FIG. 2 shows one embodiment of a controller 130 to determine an RAP according to the present invention. The controller 130 may comprise an achievement data module 202, an operating condition module 204, a starting RAP module 206, an RAP adjustment module 208, and a storage module 210.

In one embodiment, the achievement data module 202 is configured to receive required regeneration conditions 212 and current component conditions 214. The required regeneration conditions 212 may comprise the conditions required at the exhaust component to achieve a regeneration. In one embodiment, the exhaust component is the particulate filter 150, and the required regeneration conditions 212 are a minimum temperature after the catalytic component 142. Any set of parameters which can be measured or estimated, and which would be indicative of successful regeneration of the exhaust aftertreatment component, will suffice as the required regeneration conditions 212.

The achievement data module 202 is further configured, in one embodiment, to receive the current component conditions 214. The achievement data module 202 compares the required regeneration conditions 212 with the current component conditions 214 to determine whether a regeneration attempt is successful. In one embodiment, the achievement data module 202 provides a Boolean flag to indicate successful regeneration (e.g. —TRUE) or unsuccessful regeneration (e.g. —FALSE). In a further embodiment, the achievement data module 202 provides the Boolean flag only when the system 100 is in a condition where a regeneration of the exhaust aftertreatment component is being attempted.

The operating condition module 204 is configured, in one embodiment, to receive the current operating condition 216. The operating condition 216 describes selected operating parameters of the system 100. The operating parameters selected can vary widely, but typically will be operating parameters that tend to affect the difficulty of the system 100 to achieve regeneration. For example, if the temperature of the ambient environment affects the ability of the system 100 to achieve a regeneration, the operating condition 216 may be the current ambient temperature. The operating condition 216 may be lumped into discrete categories. For example, if the operating condition 216 were current ambient temperature lumped into discrete categories, then the operating condition 216 may be a value "A," "B," or "C" where the operating condition 216 is "A" at ambient temperatures greater than 30° C., "C" at ambient temperatures less than 5° C., and "B" at temperatures between "A" and "C." In one embodiment, the operating condition 216 is a two-dimensional combination of engine speed and engine torque, comprising a value from 1 to 5, where each of 1 to 5 correspond to a range of engine speed and torque values (see FIG. 3).

The starting RAP module 206 is configured, in one embodiment, to read a starting RAP 218. In one embodiment, the starting RAP 218 is a profile that is pre-loaded into the system 100 by a manufacturer or calibrator of the system 100. The data for pre-loading the starting RAP 218 may be selected from regeneration availability data for the primary market segment of the exhaust gas aftertreatment component, from the highest risk market segment of significant size for the exhaust gas aftertreatment component, or any other desired source. For example, if the highest risk market segment for the exhaust gas aftertreatment component were known to be capable of regenerating 15% of the time requested, the initial factory calibration might be set to pre-load 15% as the starting RAP 218. In a preferable embodiment, the primary market segment is selected for pre-loading data to maximize fuel economy for a group of exhaust gas aftertreatment components, while the highest risk market segment is selected to minimize the risk of the default control system being initially too aggressive for a high risk application. The starting RAP 218 may be stored on the controller 130 in a memory storage device, or it may reside on some other part of the system 100 and be read into the controller 130, for example over a datalink.

The starting RAP 218, in one embodiment, is not stored directly but is derived by the starting RAP module 206 at run-time from other data that is stored directly. For example, the starting RAP 218, in one embodiment, may comprise a percentage value representing the percentage of time that the system 100 successfully regenerates while attempting a regeneration, like 41%. The system 100 may have the starting RAP 218 stored directly as 41%, and the starting RAP module 206 may be configured to read in that value. The system 100 may have the underlying data stored, for example 4,100 seconds of successful regeneration, and 10,000 seconds of attempted regeneration, and the starting RAP module 206 may be configured to read in the underlying data and translate that information to a starting RAP 218 of $4,100/10,000=41\%$. In one embodiment, the starting RAP 218 read in by the starting RAP module 206 comprises the adjusted RAP 220 from a previous execution cycle of the controller 130.

The RAP adjustment module 208 is configured, in one embodiment, to utilize achievement data provided by the achievement data module 202, the starting RAP 218, and the current power application operating condition 216, to generate an adjusted RAP 220. In one embodiment, the RAP adjustment module 208 generates an adjusted RAP 220 which reflects the aggregate regeneration availability of the system 100. Advantageously, in another embodiment, the RAP adjustment module 208 generates an adjusted RAP 220 which reflects the regeneration availability of the system 100 at each of a set of potential operating conditions 216.

As a first example, we show an embodiment where the RAP adjustment module 208 generates and adjusted RAP 220 which reflects the aggregate regeneration availability of the system 100. In this embodiment, the RAP adjustment module 208 may be configured to track the total time wherein the system 100 attempts a regeneration of the exhaust aftertreatment component, and the total time wherein the system 100 succeeds in meeting the conditions to regenerate the exhaust aftertreatment component. For example, the RAP adjustment module 208 may track the total time ($T_1$) wherein the achievement data module 202 provides a FALSE or TRUE, reflecting the total time where the system 100 is attempting a regeneration, and the RAP adjustment module may track the total time ($T_2$) wherein the achievement data module 202 provides only a TRUE, reflecting the total time where the system 100 succeeds at regenerating the exhaust aftertreatment component. In one embodiment, the adjusted RAP 220 may simply be $T_1/T_2$. For example if $T_1$ is 4,100 seconds, and $T_2$ is 10,000 seconds, then the adjusted RAP 220 would be 0.41, or 41%. To clarify the operations of the timers for the example, if the succeeding 30 seconds involve the system 100 successfully attempting a regeneration, $T_1$ increments to 4,130 while $T_2$ increments to 10,030, and the adjusted RAP 220 moves to 0.412, or 41.2%.

An enhancement to the first example might be to weight recent information more heavily than older information. Those of skill in the art will recognize many methods to implement the enhancement, but the use of a first-order filter is illustrated as one embodiment. In this example, a maximum value for $T_1$ and $T_2$ is selected, preferably on the order of a time value that should be "reflected" by the adjusted RAP 220. For example, if the adjusted RAP 220 should reflect the last 4 days worth of attempted regeneration availability, the maximum time value should be set to approximately 345,000 seconds. In this example enhancement, $T_1$ and $T_2$ should be adjusted according to the following equation:

$$T_{new} = FC * T_{old} + FC * (MaxVal, 0) \qquad \text{Equation 1}$$

Where $T_{new}$ is the adjusted value of $T_1$ or $T_2$, $T_{old}$ is the value of $T_1$ or $T_2$ from the previous execution. The value (MaxVal,0) is either MaxVal or 0 (zero), where MaxVal is the selected maximum value for $T_1$ and $T_2$. The value MaxVal should be selected in equation 1 for $T_1$ whenever the system 100 is attempting a regeneration and is successful at achieving the regeneration conditions, while the value 0 should be selected in equation 1 for $T_1$ at all other times. The value MaxVal should be selected in equation 1 for $T_2$ whenever the system 100 is attempting a regeneration, and the value 0 should be selected in equation 1 for $T_2$ whenever the system 100 is not attempting a regeneration. FC is a first order filter constant determined from Equation 2:

$$FC = e^{\left(\frac{-1}{MaxVal}\right)}. \quad \text{Equation 2}$$

Figure 3:
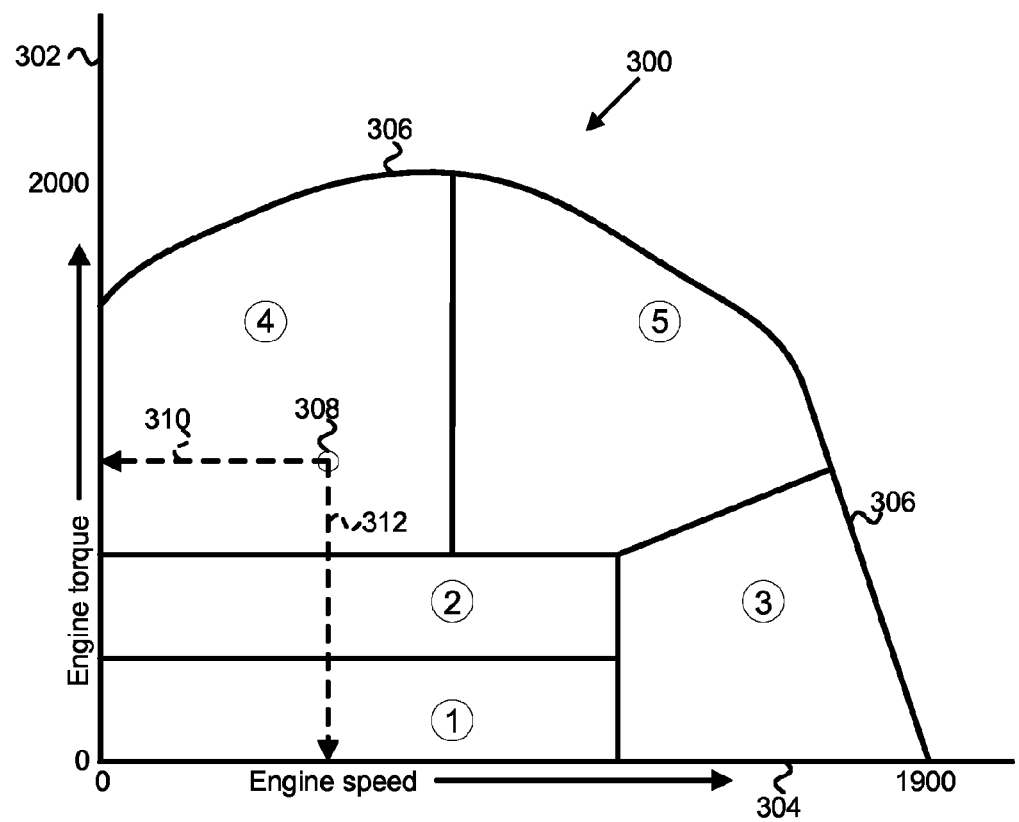
FIG. 3 is a schematic flow chart diagram illustrating one embodiment of a regeneration availability profile of the present invention.
Figure 3:
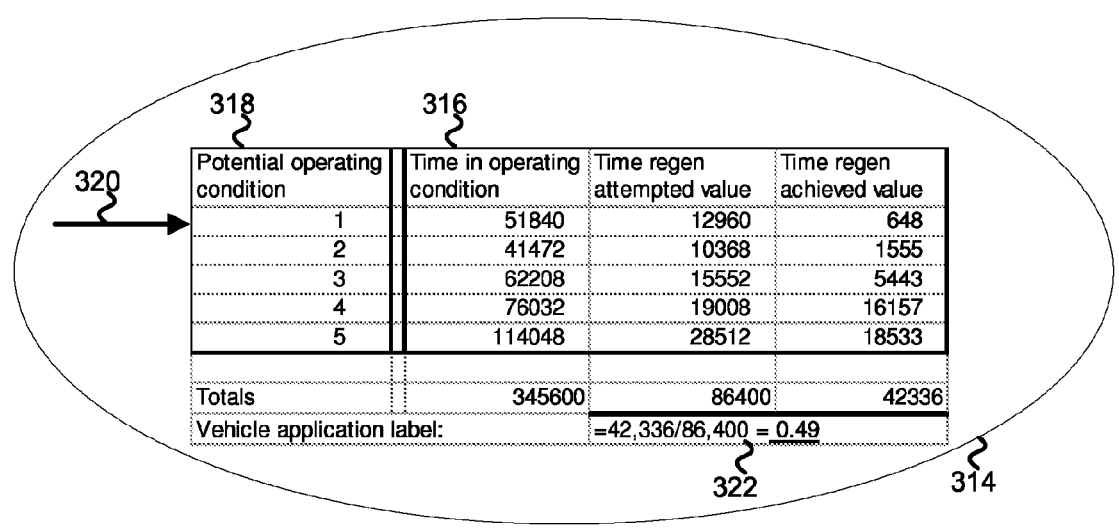

As a second example, we show an embodiment where the RAP adjustment module 208 generates an adjusted RAP 220 which reflects the regeneration availability of the system 100 at each of a set of potential operating conditions 216. For this example, the RAP adjustment module 208 maintains a set of 5 potential power application operating conditions as shown in FIG. 3. The 5 potential power application operating conditions are described by ranges of engine speed 304 and engine torque 302, and bounded by a torque curve 306 associated with the engine 110.

The adjusted RAP 220 comprises a set of 5 regeneration success values, each regeneration success value comprising a $T_{x1}$ and a $T_{x2}$ corresponding to a power application operating condition, where x is the number of the corresponding power application operating condition. In one embodiment, the value $T_{x1}$ is incremented whenever the system 100 is operating within the operating condition x, the system 100 is attempting a regeneration, and the system 100 is successful in achieving the required regeneration conditions 212. Likewise, $T_{x2}$ is incremented whenever the system 100 is operating within the operating condition x and the system 100 is attempting a regeneration, regardless of whether the required regeneration conditions 212 are met.

An enhancement to the second example weights recent information more heavily than older information, and may utilize a first-order filter using equations 1 and 2. In one embodiment, the enhancement applies equations 1 to $T_{x1}$ every execution step, using MaxVal in equation 1 if the system 100 is operating within the operating condition x, the system 100 is attempting a regeneration, and the required regeneration conditions 212 are met. For example, if the system 100 is operating within operating condition 1, attempting a regeneration, and the required regeneration conditions 212 are currently met, the RAP adjustment module 208 will apply equation 1 to $T_{11}, T_{21}, T_{31}, T_{41}$, and $T_{51}$, and will use the value 0 in equation 1 for $T_{21}$-$T_{51}$, but use the value MaxVal for $T_{11}$. In the example, if the system 100 is operating within the operating condition x, and the system 100 is attempting a regeneration, the RAP adjustment module 208 applies equation 1 to Tx2 using MaxVal in equation 1, regardless of whether the required regeneration conditions 212 are met. The RAP adjustment module 208 applies equation 1 to $T_{x1}$-$T_{x5}$ using 0 in equation 1 in all other circumstances, in the example.

One of skill in the art will note, in the example embodiment, that when the system 100 is operating in a condition other than x, the values $T_{x1}$ and $T_{x2}$ will both shrink such that the ratio $T_{x1}/T_{x2}$ remains constant, indicating that the amount of regeneration success in the operating condition x, but that the absolute size of $T_{x1}$ and $T_{x2}$ will shrink. Likewise, if the system 100 operates within the region x, the ratio $T_{x1}/T_{x2}$ remains constant if there is no regeneration attempted, the ratio $T_{x1}/T_{x2}$ decreases if a regeneration is attempted but unsuccessful, and the ratio $T_{x1}/T_{x2}$ increases if a regeneration is attempted, successful, and the value of $T_{x1}$ is less than MaxVal. One of skill in the art will further note that equations 1 and 2 work together as a rising filter to a selected high value (MaxVal) when equation 1 is used with MaxVal, and equations 1 and 2 work together as a falling filter to a selected low value when equation 1 is used with 0 (or another low value).

The storage module 210, in one embodiment, stores the adjusted RAP 220. Storing the adjusted RAP 220 may comprise writing the value into a memory device on the controller 130, or providing the value to a datalink for use elsewhere in the system 100. Further, storing the adjusted RAP 220 may comprise storing data used to derive the adjusted RAP 220.

FIG. 3 illustrates one embodiment of an adjusted RAP 314 in accordance with the present invention. The adjusted RAP 314 of FIG. 3 comprises a set of regeneration availability data segments 316 corresponding to a set of potential operating conditions 318. One line-item 320 from the adjusted RAP 314 indicates the time in operating condition 1 is 51,840, the time that regenerations have been attempted within operating condition 1 is 12,960, and the time that the required regeneration conditions 212 have been achieved within operating condition 1 is 648.

In one embodiment, the units of the times within the adjusted RAP 314 are in seconds. In one embodiment, the enhanced example shown above using equations 1 and 2 was utilized in generating the adjusted RAP 314, with a MaxVal of 345,600, and the times 316 reflected within the adjusted RAP 314 reflect approximately the last 345,600 seconds of system 100 operation. In another embodiment, the times reflected within the adjusted RAP 314 reflect total accumulated times, and the values for all of these times 316 will always increase with further system 100 operation.

The adjusted RAP 314 shows a vehicle application label 322, which is simply the sum of successful regeneration time over the sum of attempted regeneration time, in the given example. The vehicle application label could be a quantity derived from the data available within the adjusted RAP 314 reflecting some other priority—for example utilizing only one of the system 100 operating conditions. In one embodiment, the vehicle application label 322 could be a discrete category label derived from a calculated value. For example, the vehicle application label could use the same ratio shown in the adjusted RAP 314, but have a category "A" for values 0-0.25, "B" for values 0.25-0.6, and "C" for values 0.6-1.0. Many other implementations are possible from the type of data available for the adjusted RAP 314, and the specific selection for the vehicle application label depends upon the priorities of the system 100. The vehicle application label 322 could also be series of values, for example a historical list of values to look for trends over time in the adjusted RAP 314.

The power application operating condition diagram 300 illustrates one embodiment of a series of potential power application operating conditions 318. The selected criteria for defining the power application operating conditions are an engine speed axis 304 and an engine torque axis 302. When the current engine 110 speed and torque fall within the area labeled 3, the current power application operating condition is 3. For example, if the system 100 is operating at point 308, with corresponding engine speed 312 (approximately 400 units) and engine torque 310 (approximately 1000 units), then the system 100 is operating within the power application operating condition 4. The boundary 306, in one embodiment, is the torque curve for the engine 110.

Figure 4:
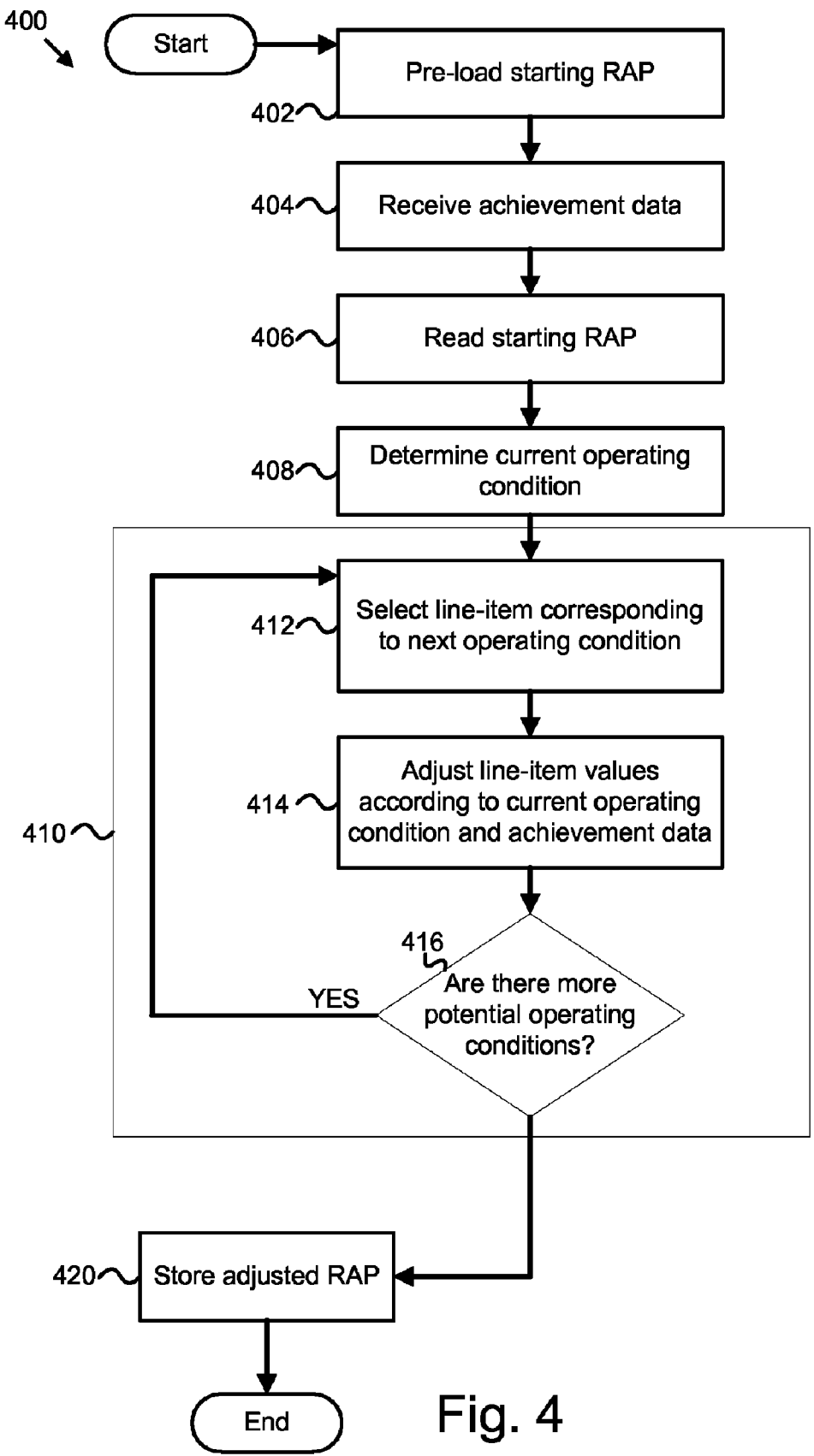
FIG. 4 is a schematic flow chart diagram illustrating one embodiment of a method to calculate a regeneration availability value in accordance with the present invention.

FIG. 4 is a schematic flow chart diagram illustrating one embodiment of a method 400 to determine an RAP in accordance with the present invention. The method 400 starts with pre-loading 402 the starting RAP 218, in one embodiment.

The achievement data module 202 may proceed with receiving 404 achievement data relative to successfully achieving regeneration conditions of an exhaust gas aftertreatment component. The achievement data may comprise required regeneration conditions 212 and current component conditions 214. The starting RAP module 206 may then read 406 the starting RAP 218, and the operating condition module may determine 408 the current power application operating condition.

The method 400 proceeds, in one embodiment, with generating 410 and adjusted RAP 220 utilizing the achievement data, the starting RAP 218, and the current power application operating condition. In one embodiment, generating 410 the adjusted RAP 220 comprises selecting the line-item 320 corresponding to the next operating condition 318, adjusting the line-item 320 values 316 according to the current operating condition 308, and achievement data. Generating 410 the adjusted RAP 220 may further comprise checking 416 that all operating conditions 318 have been checked, by iterating back to selecting 412 the next line-item 320 until all operating conditions 318 are checked. The method 400 may conclude with the storage module 210 storing 420 the adjusted RAP 220.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An exhaust gas aftertreatment system for calculating a regeneration availability profile, the system comprising:
   an exhaust gas aftertreatment component requiring intermittent regeneration;
   at least one sensor configured to detect operating conditions of the exhaust gas aftertreatment component;
   a controller having:
      an achievement data module configured to receive achievement data relative to successfully achieving regeneration conditions of the exhaust gas aftertreatment component;
      an operating condition module configured to determine a current power application operating condition from a set of potential power application operating conditions;
      a starting RAP module configured to read a starting RAP comprising a set of regeneration availability data segments corresponding to the set of potential power application operating conditions;
      a RAP adjustment module configured to generate an adjusted RAP utilizing the achievement data, the starting RAP, and the current power application operating condition; and
      a storage module configured to store the adjusted RAP.

2. The system of claim 1, further comprising an internal combustion engine, wherein the current power application operating conditions comprise operating conditions of the internal combustion engine, and wherein the set of potential power application operating conditions comprise potential operating conditions of the internal combustion engine.

3. A computer program product comprising a computer useable medium having a computer readable program stored on a tangible storage device, wherein the computer readable program when executed on a computer causes the computer to perform operations comprising:
   receiving achievement data relative to successfully achieving regeneration conditions of the exhaust gas aftertreatment component;
   determining a current power application operating condition from a set of potential power application operating conditions;
   reading a starting RAP, the starting RAP comprising a set of regeneration availability data segments corresponding to the set of potential power application operating conditions;
   generating an adjusted RAP utilizing the achievement data, the starting RAP, and the current power application operating condition; and
   storing the adjusted RAP.

4. The computer program product of claim 3, wherein the current power application operating condition comprises a current engine speed of the power application, and a current engine work load of the power application.

5. The computer program product of claim 3, wherein the set of potential power application operating conditions comprise selected regions of the speed-load space defined by a current engine speed of the power application in a first dimension, and a current engine work load of the power application in a second dimension.

6. The computer program product of claim 3, wherein generating an adjusted RAP further comprises adjusting each of the set of regeneration availability data segments corresponding to the set of potential power application operating conditions with one of a rising filter to a selected high value and a falling filter to a selected low value, and wherein the rising filter and falling filter use a filter constant selected from a set of filter constants, the filter constants selected according to the current power application operating condition, the corresponding data segment, and the achievement data.

7. The computer program product of claim 3, the operations further comprising pre-loading the starting RAP, wherein pre-loading the starting RAP comprises determining the appropriate RAP for the highest risk market segment of significant size for the power application.

8. A method for calculating a regeneration availability profile (RAP) of an exhaust gas aftertreatment component, the method comprising:
   receiving achievement data relative to successfully achieving regeneration conditions of the exhaust gas aftertreatment component;
   determining a current power application operating condition from a set of potential power application operating conditions;
   reading a starting RAP, the starting RAP comprising a set of regeneration availability data segments corresponding to the set of potential power application operating conditions;
   generating an adjusted RAP utilizing the starting RAP, the achievement data, and the current power application operating condition; and
   storing the adjusted RAP.

9. The method of claim 8, further comprising storing a series of adjusted RAP values over a period of time.

10. The method of claim 8, wherein generating the adjusted RAP comprises storing new data and deleting old data in a first-in/first-out data buffer.

11. The method of claim 8, wherein generating the adjusted RAP comprises storing data values into a buffer, wherein the buffer data is weighted according to a constant for each of the data values, and wherein the constants for each data value are such that recent data values are given more weight in determining the adjusted RAP than older data values.

12. The method of claim 8, further comprising determining a vehicle application label from the adjusted RAP, wherein the vehicle application label comprises a discrete categorical value.

13. The method of claim 8, further comprising determining a vehicle application label from the adjusted RAP, wherein the vehicle application label comprises a number, wherein the number relates to a vehicle application label scale.

14. The method of claim 8, wherein generating an adjusted RAP further comprises adjusting the starting RAP with one of a rising filter to a selected high value and a falling filter to a selected low value, and wherein the rising filter and falling filter use a filter constant selected from a set of filter constants, the filter constants selected according to the achievement data.

15. The method of claim 14, further comprising reporting a vehicle regeneration availability label determined according to the adjusted RAP, and wherein the set of filter constants is configured such that the vehicle regeneration availability label moves more quickly in the direction favorable-to-unfavorable than in the direction unfavorable-to-favorable.

16. The method of claim 8, further comprising pre-loading the starting RAP.

17. The method of claim 16, wherein pre-loading the starting RAP comprises determining the appropriate RAP for the primary market segment associated with the exhaust gas aftertreatment component.

18. The method of claim 16, wherein pre-loading the starting RAP comprises determining the appropriate RAP for the highest risk market segment of significant size for the exhaust gas aftertreatment component.

19. The method of claim 8, wherein the adjusted RAP data comprises a set of regeneration availability data segments corresponding to the set of potential power application operating conditions.

20. The method of claim 19, wherein the current power application operating condition comprises a current ambient temperature.

21. The method of claim 19, wherein the current power application operating condition comprises a current ambient pressure.

22. The method of claim 19, wherein generating an adjusted RAP further comprises adjusting each of the set of regeneration availability data segments corresponding to the set of potential power application operating conditions with one of a rising filter to a selected high value and a falling filter to a selected low value, and wherein the rising filter and falling filter use a filter constant selected from a set of filter constants, the filter constants selected according to the current power application operating condition, the corresponding data segment, and the achievement data.

23. The method of claim 22, further comprising reporting a vehicle regeneration availability label determined according to the adjusted RAP, and wherein the set of filter constants is configured such that the vehicle regeneration availability label moves more quickly in the direction favorable-to-unfavorable than in the direction unfavorable-to-favorable.

24. The method of claim 19, wherein the current power application operating condition comprises a current engine speed of the power application, and a current engine work load of the power application.

25. The method of claim 24, further comprising pre-loading the starting RAP.

26. The method of claim 25, wherein pre-loading the starting RAP comprises determining the appropriate RAP for the primary market segment associated with the power application.

27. The method of claim 25, wherein pre-loading the starting RAP comprises determining the appropriate RAP for the highest risk market segment of significant size for the power application.

* * * * *